Oct. 28, 1941.  W. H. KOPITKE  2,260,750
METHOD OF AND MACHINE FOR MAKING HOLLOW ARTICLES FROM PLASTICS
Filed July 8, 1938  5 Sheets-Sheet 1
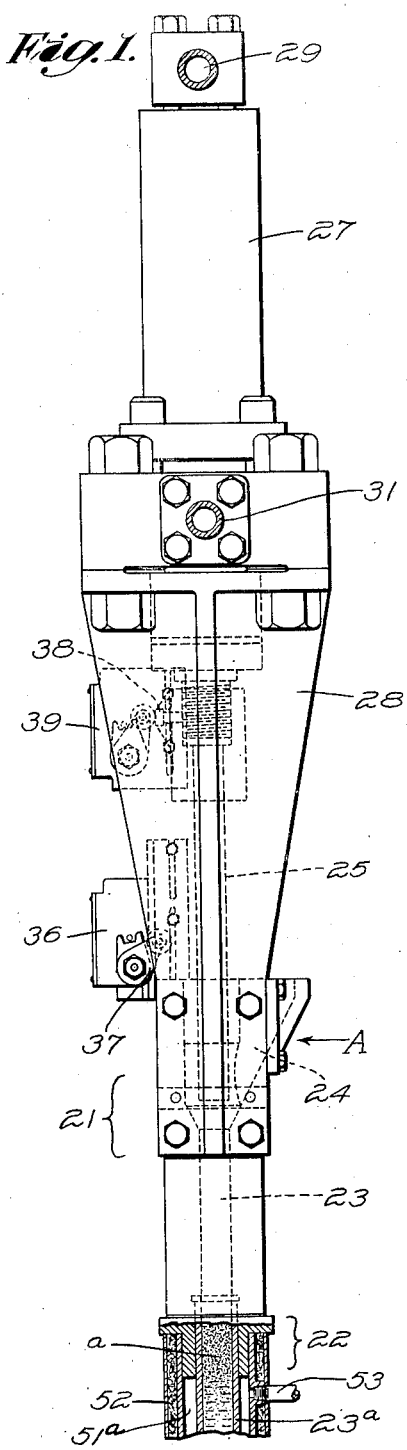
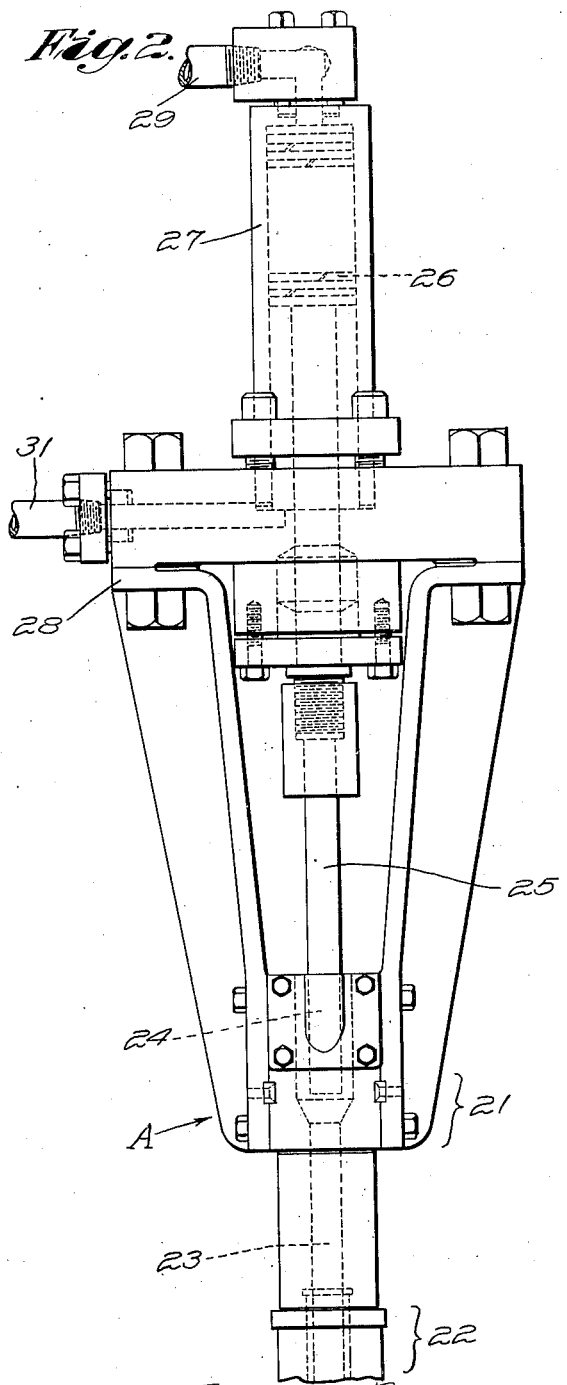

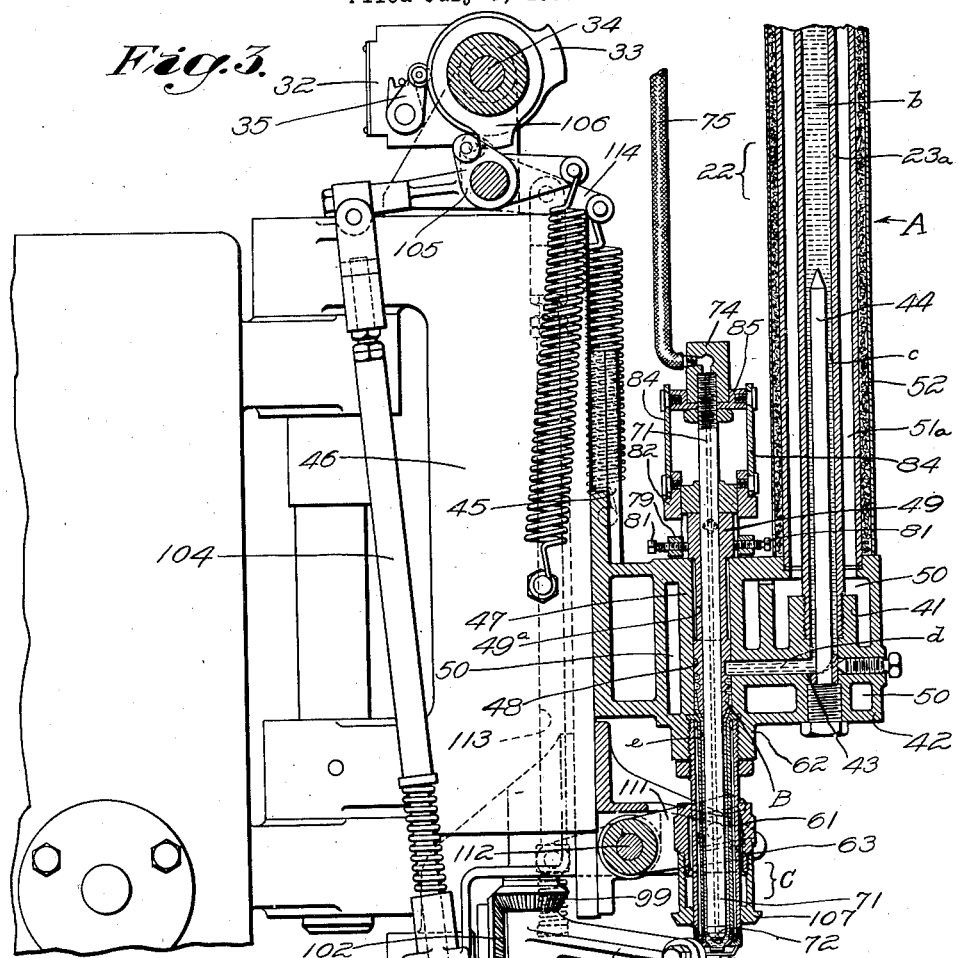

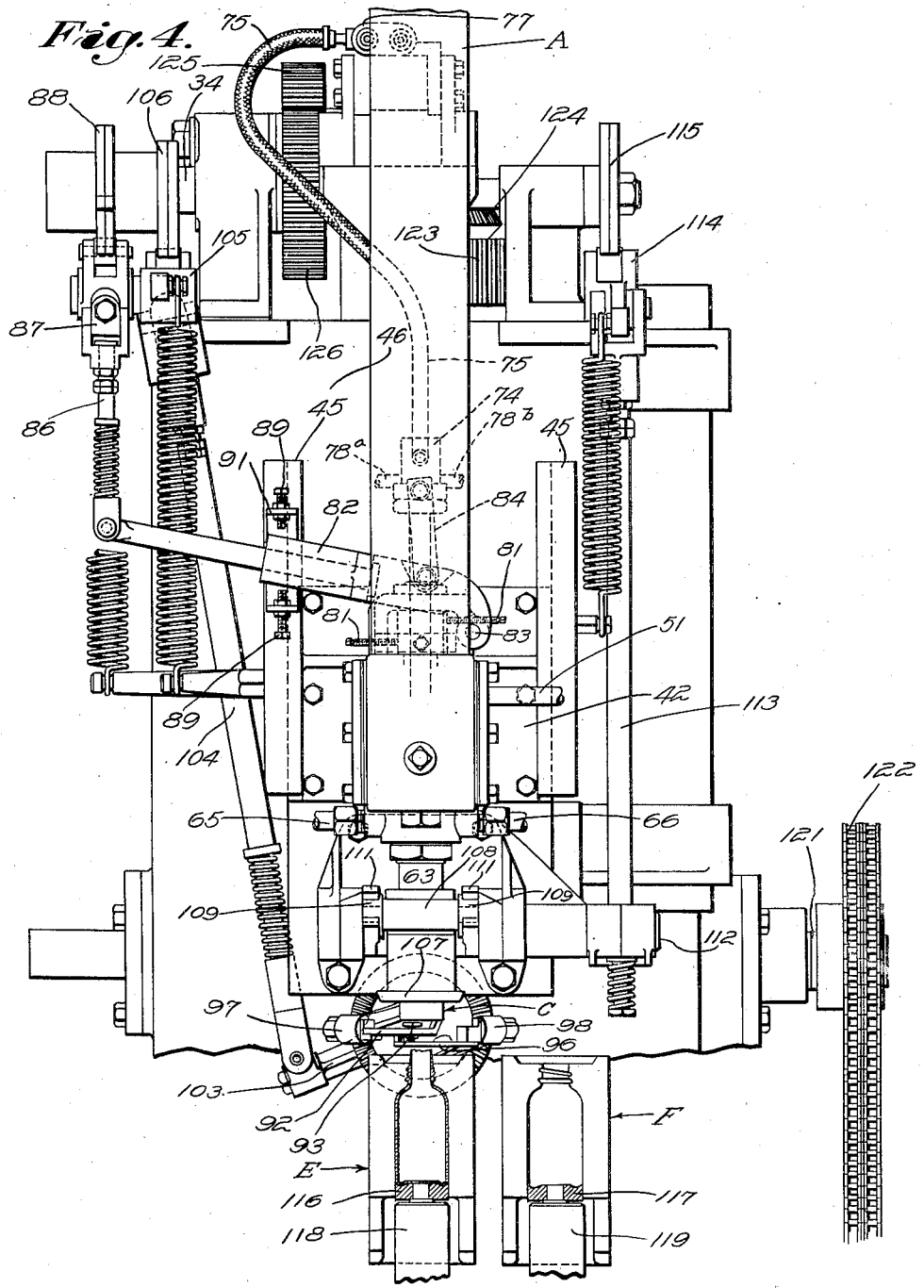

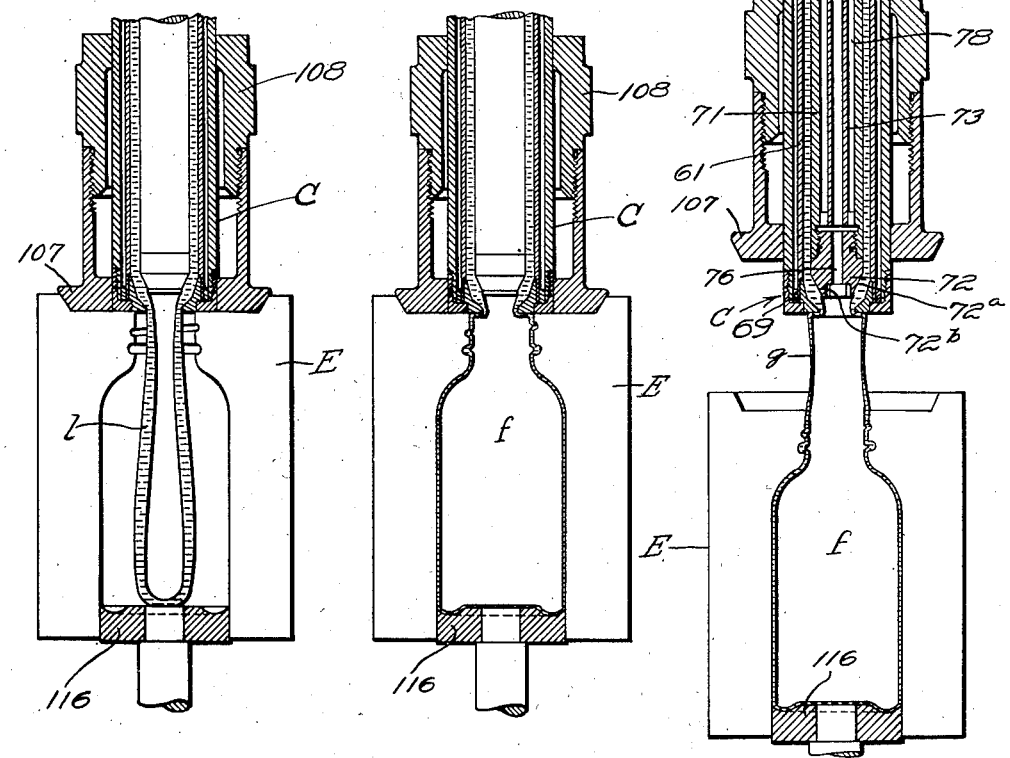

Oct. 28, 1941.        W. H. KOPITKE        2,260,750
METHOD OF AND MACHINE FOR MAKING HOLLOW ARTICLES FROM PLASTICS
Filed July 8, 1938        5 Sheets-Sheet 5

Witness
W. B. Thayer.

Inventor
William H. Kopitke
by Brown+Parham
Attorneys

Patented Oct. 28, 1941

2,260,750

UNITED STATES PATENT OFFICE 2,260,750

METHOD OF AND MACHINE FOR MAKING HOLLOW ARTICLES FROM PLASTICS

William H. Kopitke, West Hartford, Conn., assignor, by mesne assignments, to Plax Corporation, Hartford, Conn., a corporation of Delaware Application July 8, 1938, Serial No. 218,057

21 Claims. (Cl. 18—5)

This invention relates to the production of hollow articles, such as containers, from organic plastic materials, which are capable of being softened and made workable by heating at relatively low temperatures whereby they may be formed into articles; which are expansible under fluid pressure or may be blown; and which are capable of being rigidified after being expanded into articles of the desired shapes.

It has previously been proposed (see U. S. patent to Ferngren, No. 2,128,239, granted Aug. 30, 1938, and a patent granted to the present applicant and said Ferngren, No. 2,175,054, issued Oct. 3, 1939) to make hollow articles, such as containers or bottles, from organic plastic materials by first forming the material into a tubular form, closing the leading end of the tubular body of material, extruding the tubular body from confinement as a closed-ended hollow body and blowing this to final shape in a mold.

The present invention is an improvement in a method and an apparatus for making hollow articles and has for its general object the production of articles of better quality, that is, of more uniform character and of better appearance, than articles which could previously be made.

A specific object of the invention is to provide a novel method and novel apparatus for forming a plastic material free from volatile solvents into a tube, which is substantially uniform in wall thickness, free of seams or other defects and of good optical appearance. Prior to this invention, satisfactory tubes or tubes of uniformly good quality could not be produced from certain organic plastic materials without volatile solvents, such as cellulose acetate with one or more suitable plasticizers.

Another object is to provide a novel method and novel means for closing the leading end of a tubular body of organic plastic material, so that it may be expanded or blown into a hollow article. By the employment of the invention, I am able to reduce to a minimum defects or weaknesses in the closed end of the tubular body and hence in the end of the article formed by blowing this body. It is difficult to avoid such defects because certain organic plastic materials without volatile solvents, such as cellulose acetate, do not readily weld at the open end of a tubular body thereof; and the blowing operation does not remove the defects resulting from the end closing operation.

The manner in which the above and other objects and advantages are accomplished or obtained will be pointed out in, or will be apparent from, the detailed description which follows and which has reference to the accompanying drawings, which show a novel machine and two forms of the novel method embodying the invention.

In said drawings:

Figure 1 is a view in side elevation with parts in vertical section of the upper portion of a plasticating device forming a part of a machine embodying the present invention;

Fig. 2 is a view in front elevation of the construction shown in Fig. 1;

Fig. 3 is a view partly in side sectional elevation and partly in vertical section of a portion of a machine embodying the invention and illustrating the lower portion of the plasticating device of Figs. 1 and 2 and tube forming, end-closing and blowing portions of said machine;

Fig. 4 is a view in front elevation of the portion of the machine shown in Fig. 3;

Fig. 5 is an enlarged view partly in section and partly in elevation of an element of my novel tube forming means;

Fig. 6 is a detailed view in side elevation of a plug operating mechanism shown in place in front elevation in Fig. 4;

Figure 13:
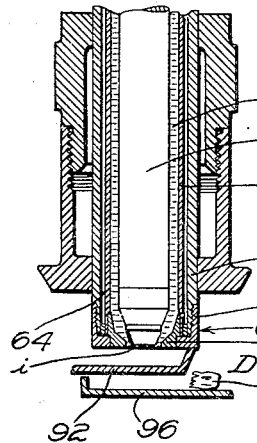

Figs. 7 to 12 inclusive are enlarged views in central vertical section of tube forming, tube closing and blowing and molding means of Figs. 3 and 4, depicting several steps of the novel method; and Figs. 13 to 18 inclusive are views similar to Figs. 7 to 12, showing a modification of the method thereof.

Although the invention is limited to organic plastic materials as hereinabove defined, it may be employed in the fabrication into hollow articles of such materials of widely varying compositions. Such materials may be of the thermoplastic type, which rigidify upon cooling and are fusible, or of the thermosetting type which harden under heat and are then infusible, or any desired mixtures of such types. Such materials may be supplied in powdered or granular condition or in liquid, semi-liquid or viscous condition, with or without fillers, catalyzers, coloring agents or modifying agents, but preferably are substantially or entirely free of volatile solvents, which might result in uncontrolled shrinkage or other objectionable characteristics in the finished articles.

By way of illustration and not in limitation of the invention, I have disclosed a machine and methods which may be performed by said machine for making hollow containers from an organic thermoplastic material such as cellulose acetate with suitable plasticizer, but substantially free of volatile solvents and initially supplied in powdered or granular form.

The method of the invention, generally considered, comprises a plasticating device A, Figs. 1, 2, 3 and 4, a tube forming device B, Figs. 3 and 5, an extruding nozzle C, severing and tube closing device D, and blow molds E and F, Figs. 3, 4 and 7 to 18. These parts are so constructed and arranged that powdered plastic is plasticated, formed into a tube, the end of the tube closed and severed, and closed tubes extruded alternately into the molds E and F, in which hollow articles are formed by blowing said tubes therein.

The construction and operation of the various parts of the machine will now be described in detail.

The plasticating device A comprises two main portions 21 and 22, Figs. 1 and 2. The upper portion 21 includes a cylinder 23 which receives granular or powdered plastic from a feed passage 24; and the lower portion 22 contains an extension 23a of said cylinder. A plunger 25 supported by said upper portion 21 operates in the cylinder 23—23a.

The plunger 25 is reciprocated by a piston 26 in a cylinder 27 bolted to the top of a frame 28, in the lower part of which the cylinder 23 is secured. The piston 26 and the plunger 25 are operated hydraulically by the admission and exhaust of fluid under pressure to and from the opposite ends of the cylinder 27 through conduits 29 and 31 which lead from a pump, not shown.

Controls preferably are provided for starting the down-stroke of the plunger at the desired time in relation to the operation of other parts of the machine, to regulate the length and speed of said downstroke, to reverse the plunger and to stop the reverse or upstroke.

The downstroke of the plunger 25 is started by an electric switch 32, Fig. 3, which is closed at the proper time by a cam 33 on a timing shaft 34, which cam operates a crank 35 of said switch.

The plunger stroke is reversed by a switch 36, Fig. 1, adjustably bolted to the frame 28 and including a crank 37 which is engaged by a button 38 on the plunger 25 at the lower end of the plunger stroke. This button 38 also operates a third switch 39 adjustably bolted to frame 28 in a position to be operated by the button as the plunger nears the end of its upstroke. This stops the upstroke of the plunger.

The switches 32, 36 and 39 operate valves associated with the pump which supplies pressure fluid to cylinder 27. The pump and associated valves (not shown) form no part per se of the invention and may be of known construction.

The cylinder extension 23a is screw-threaded at its bottom end in an internal boss 41, Fig. 3, of a casting 42 and communicates with a horizontal passage 43 in said casting. A long core 44 mounted in said casting is centrally located in the lower part of said cylinder extension. The casting 42 is adjustably mounted in guides 45—45 on the frame 46 of the machine. The machine except as specifically described may be built substantially as disclosed in Patent No. 2,175,054 above referred to.

The casting 42 contains a vertical tubular wall or partition 47, in the bore 48 of which is mounted the tube-forming device or bushing B and other parts hereinafter described, and with which the passage 43 communicates. The tube-forming device or bushing B has a head 49 which engages the top of the casting 42 and holds the bushing against downward movement in the bore 48. For some distance below head 49, the bushing is reduced in diameter as indicated at 49a.

The wall 47 and the passage 43 are surrounded by a heating chamber 50 into which hot oil is conducted through an inlet pipe 51, Fig. 4, to heat the bore 48, the bushing B, the passage 43, the boss 41 and the core 44 in order to maintain the organic plastic material therein at the desired temperature or temperatures. Such oil flows out of the chamber 50 in the casting 42 into the bottom end of an annular chamber 51a surrounding the cylinder extension 23a and formed by an insulated jacket 52, and is discharged at the top of said chamber through an outlet 53, Fig. 1. Thus, the oil heats the cylinder extension 23a.

The device B will now be described, but before proceeding with this description, it should be explained that prior to this invention it was proposed to form organic plastic material free from volatile solvents into a tubular body by passing a solid stream of such material into a chamber containing a plain or cylindrical mandrel or former having a smooth surface. This operation forced the material to flow around the mandrel or former and to unite to form a tube which was then extruded. However, difficulties were experienced with this method of forming a tube because a seam or seams, vertical streaks and optical or other defects, were produced therein which could not be removed and which therefore constituted defects in the extruded tubing or articles made therefrom. This was occasioned by the inevitable division of the material into two or more streams in its passage about the webs or fins by which the former or mandrel was spaced from the walls of the extrusion passage. These difficulties were largely the result of attempting to unite or weld the plastic material after this division, which could not be accomplished satisfactorily. Although tubes of good quality have been produced heretofore from organic plastic materials containing substantial amounts of volatile solvents, this has certain disadvantages, such as excessive and sometimes uncontrollable shrinkage resulting from the evaporation of these solvents.

After considerable study and experimenting, I discovered that uniform, seamless tubing could be produced by employing the tube forming device B as shown in Figs. 3 and 5. The device B is held stationary in the bore 48 in such position that a circular inlet 54 on the exterior thereof registers with the passage 43 and receives a solid stream of organic plastic material therefrom. Leading from the inlet 54 is a helical groove 55 formed on the exterior of the bushing between the turns of the thread 56. The groove 55 is closed by the walls of the bore 48 for about one-half a turn from the inlet 54, the bushing and about the first one-half turn of thread 56 being of about the same diameter as and tightly fitting, the bore 48 from where the reduced portion 49a ends down to about the point indicated at 56a, Fig. 5. At this point, the thread begins to decrease very slightly in diameter and gradually decreases in diameter as indicated at 56b, 56c, 56d to the end of the thread and of the groove.

This decrease in diameter of thread 56 results from the taper of the bushing B, which taper starts at about the point 56a and continues downwardly past the end of the groove 55 and to the end of the smooth portion 57. The portion 57 joins a sharply tapered bottom or end portion 58 of the bushing. The end portion 58 is spaced from the tapered entrance portion 59 of the outer tube 61 of the nozzle C as shown, Fig. 5.

Referring to Fig. 5, it will be seen that inasmuch as bore 48 is of uniform diameter and the bushing B is downwardly tapered, there is provided between the bushing and the walls of the bore an annular passage of decreasing internal diameter and hence increasing width and cross sectional area from the point 56a to the end of the portion 57 as a result of which adjacent turns of the groove 55 (excepting the first half turn) are in direct communication with one another.

The organic plastic material flowing from the passage 43 through the bore 48 and into nozzle C is transformed into a tube, which when it issues from nozzle C is uniform in thickness, uniform or homogeneous in character and of good optical appearance. The manner in which the tube is formed is described in detail hereinafter.

Considering now the construction of the nozzle C, it will be observed by reference to Figs. 3 and 7 to 18 that the outer nozzle tube 61 is clamped in a boss 62 of the casting 42 by means of an outer sleeve 63 screw-threaded into said boss and engaging a flange on the upper end of the tube 61. The tube 61 and the sleeve 63 are held in spaced relation to form a chamber 64 for hot oil, which flows into and out of said chamber through conduits 65 and 66, Fig. 4. The tube 61 and the sleeve 63 are connected at their bottom ends by means of an orifice ring 67, screw-threaded in the bottom of the sleeve 61, and a collar 68 screw-threaded on tube 63 and having a tight fit on said ring. A packing ring 69 may be inserted between the bottom ends of the tube 61 and the sleeve 63.

The nozzle C contains a tubular plug or inner nozzle member 71, as shown in Figs. 3 and 7 to 18. This member is provided for the purpose of controlling the flow of organic of plastic tubing through the orifice ring 67, the tip 72 of said plug, as shown in Fig. 12, being tapered at 72a and terminating in a cylindrical end portion 72b of reduced diameter, which end portion, as shown in Figs. 16 and 17, may have a sliding fit in the orifice 67a of the ring 67. The ring 67 is internally tapered at 67b and 67c. The tip 72 and the orifice ring 67 are constructed, as above described, to constrict the tube of organic plastic material where it issues from the nozzle C for a purpose hereinafter described.

The inner nozzle member or plug 71 also serves to supply air under pressure to the interior of the tubular body of organic plastic material, this member containing an air tube 73, Fig. 12, which is connected at its upper end, Figs. 3 and 4, to a head 74, to which air is conducted through a flexible tube 75. The bottom end of the tube 73 discharges air through an aligned hole 76 in the tip 72 of the plug. Admission of air to the hole 76 is controlled by a multiple valve 77, Fig. 4, which controls the supply of low and high pressure air respectively at the desired times. This valve is operated by means, not shown, including cams on the timing shaft 34.

The inner nozzle member or plug 71 further serves internally to heat the organic plastic material in the nozzle C, a heating chamber 78, Fig. 12, being formed between the tube 73 and the outer tube of the inner nozzle member. To this chamber oil is supplied and exhausted through an inlet 78a and an outlet 78b connected to the head 74 on the inner nozzle member, as indicated in Fig. 4.

The inner nozzle member or plug 71 is centrally positioned in the nozzle C by the bushing or tube-forming device B in which it is slidably supported and enclosed for a substantial portion of its length. The member 71 is relatively long and its tip 72 is apt to be moved off center by warping or from other causes. In order to extrude a tube of uniform wall thickness and to prevent curling or bending thereof as it is extruded, it is essential that the tip 72 be accurately centered in the orifice ring 67 in the nozzle C. Therefore, I provide means for adjusting the inner nozzle member or plug 71 to adjust the tip 72 thereof to an accurately centered position. Such means comprises a U-shaped member or bracket 79, Figs. 3 and 4, which is fastened to the top of the casting 42 and holds four horizontal set screws 81 which engage the head 49 of the bushing B at four equally spaced points. By adjusting these screws against the head 49 of the bushing B, the bushing is flexed or moved sufficiently to move the inner nozzle member or plugs 71 and thus accurately to center its tip 72 in the ring 67.

In the form of the method shown in Figs. 7 to 12, the inner nozzle member or plug is held stationary; but in the form of the method shown in Figs. 13 to 18, the inner nozzle member or plug is periodically reciprocated. Periodic reciprocation of the inner nozzle member or plug 71 may be effected by means of a bifurcated lever 82, Figs. 3 and 4, pivoted at 83 on the casting 42 and having pivoted thereto links 84 connected to a crosshead 85 on the upper end of the plug 71. Figs. 4 and 6 illustrate the means for moving lever 82 up and down at the desired time, such means including an adjustable length link 86, connected to the lever 82 and to one end of a crank 87 oscillated by a cam 88 on the timing shaft 34. The connection between the lower end of the link 86 and the lever 82 is shown resilient for safety in a conventional manner.

In practicing the first form of the method, the link 86 may be disconnected or the cam 88 rendered inoperative; and the inner nozzle member or plug 71 is held stationary in a vertically adjusted position by means of opposed set screws 89 in a stationary bracket 91, Fig. 4.

Considering now the severing and tube-closing device D, it will be seen from Figs. 4 and 7 to 12 that this device comprises a knife 92 having an upturned cutting end providing a straight cutting edge and carrying a button 93, the stem 94 of which is screw-threaded in the knife 92 and has a lock nut 95 thereon for securing the adjustment of the button in respect to the knife. (The button 93 is omitted in Figs. 13 to 18.) Associated with the knife 92 is a discharge device 96 for receiving cut off bits of the organic plastic material and discharging them from the machine.

The knife 92 and the device 96 are mounted on vertically pivoted arms 97 and 98 respectively, Fig. 3, with which bevel gears 99 and 101 are associated and which gears mesh with a bevel gear 102. This gear 102 is oscillated by a crank 103, Fig. 4, connected by a link 104 to a crank 105 which is oscillated by a cam 106 on the timing shaft 34. This mechanism serves to move the knife 92 and the device 96 toward and away from each other.

The blow molds E and F are of the sectional type. Suitable means (not shown but disclosed in Patent No. 2,175,054) may be provided for opening and closing the molds, for alternately moving them into and out of alignment with the nozzle C and for raising and lowering the molds in timed relation to the operation of other parts of the machine.

The nozzle C has slidably mounted thereon an annular head 107, Figs. 3 and 4, screw-threaded on a collar 108 carrying opposed lugs 109 engaged by the bifurcated end portions of arms 111 on a shaft 112, which shaft has secured thereto a crank lever arranged to be oscillated by a link 113 connected at its upper end to a crank 114 acted on by a cam 115 on the timing shaft 34. This mechanism serves to move the head 107 downwardly on nozzle C for engagement with either of the molds E and F, as one of said molds is moved upwardly in axial alignment with the nozzle C, Figs. 10, 11, 16 and 17.

The molds E and F are provided with bottom plates 116 and 117, on supports 118 and 119 respectively, which may be supported and operated by suitable means, not shown.

In order to simplify the illustration and description of the invention, I have omitted details of the drive and some of the timing or operating mechanisms. This mechanism is, however, completely shown and described in Patent No. 2,175,054 above referred to. At 121 is shown a drive shaft which is driven by a chain 122 and which in turn rotates shafts and gears, not shown, including a spur gear 123, a bevel gear 124, a spur gear 125, and a spur gear 126 mounted on and arranged to drive the timing shaft 34. The shaft 121 and hence the timing shaft 34 are driven from a main drive shaft (not shown) which also drives, or from which are driven, the parts (not shown) for operating the molds E and F to synchronize the mold movements with the movements of the parts controlled from the timing shaft 34, all as specifically disclosed in Patent No. 2,175,054.

In performing the method of either Figs. 7 to 12 or of Figs. 13 to 18, granulated or powdered organic plastic material is supplied to the plasticating device A by suitable means, not shown, as for example by an automatic charge measuring device of known type for periodically supplying predetermined charges. Such organic plastic material may be cellulose acetate with suitable plasticizer and other modifiers, but preferably free of volatile solvents and is indicated at a in Fig. 1.

The granular or powdered organic plastic material is compressed by the plunger 25 in the cylinder extension 23a and heated as it is compressed to plasticate it as it is shown at b, Fig. 3, and to force it downwardly around the pointed core 44 and to cause it to assume tubular form as indicated at c. The organic plastic material is thus moved along its passage in thin section, whereby the plasticating or conversion to a homogeneous fluent condition may be continued more rapidly and efficiently. The organic plastic material, now in a fluent condition, is forced past the core 44 into the passage 43, where it again becomes a solid stream as indicated at d and undergoes further heating.

As above generally set forth previous devices for forming organic plastic material into a tubular body and for extruding this material as a tube have resulted in the presence of two or more seams along the sides of the tube, which were due to an imperfect welding of the material after passing the webs in the extrusion device by which the center core of the extrusion nozzle was held to or spaced from the outside member of the nozzle. Certain types of material, for example many cellulose acetate compounds, will not weld perfectly when extruded through a device of this character; and as a result tubes made by these devices have been imperfect both from the point of view of appearance and from the point of view of strength at the weld lines. The present device overcomes this difficulty by providing a substantially uninterrupted passage for the material from the point at which the material is caused to assume a tubular form to the orifice of the extrusion nozzle.

However, in reforming organic plastic material into a tubular form, it is of course necessary that there be some welding of the material. According to the present invention, however, this welding is effected substantially uniformly around the tubular body and is accompanied by a working of the material of such character that no perceptible weld lines remain in the finished tubing; nor are there any points of weakness in this tubing. This is effected by causing the material to flow as a plastic and moldable body from a single and usually cylindrical passage, first along a substantially helical path, then permitting some of the material to flow over the means or threads between adjacent turns of this path, and gradually reducing the amount of material flowing in this helical path, while correspondingly increasing the amount of material passing as an annular curtain over the threads between the turns of the helical groove, until at the termination of the helical groove forming the helical path, all the organic plastic material has been caused to flow into the annular curtain or body, which is then led through the uninterrupted annular space or passage to the extrusion nozzle as aforesaid.

In providing a device for carrying out this operation the helical path, and the clearances over the threads between adjacent turns thereof, are so designed that at first substantially all the material is caused to flow in the helical path, due to the resistance of this path to flow being less than that over the threads bounding this path. Then the resistance to flow across the threads is gradually relieved in respect to the resistance to flow through the helical path, as by providing progressively increasing clearance spaces between the threads and the member opposite them, so that the material is gradually permitted or caused to flow over the threads as an annular curtain as aforesaid. At the termination of the helical groove, all the organic plastic material is forced to flow as an annular curtain. In determining the clearances required and to some extent also the pitch for the helical path, the viscosity of the material at the time it is passing through this portion of its path must be taken into account. This viscosity is regulated as aforesaid, in the case of thermoplastic material by controlling the temperature thereof. Thus, for example, if a more viscous material is to be used, greater clearances must be provided over the threads, and vice versa.

While it is contemplated that the helical path and the clearances as aforesaid may be provided by either internal or external threads, and by using threads formed on either the inner nozzle member, here shown at 71, or the outer nozzle member, particularly including the tube 51 and/or the bore 48, there is chosen for purposes of illustration the use of a separate sleeve or bushing member B as above described, including external threads 56 and a helical groove 55.

While in the present instance the first half turn of the groove 55 defined by the thread 56 up to the point 56a, Fig. 5, is intended positively to confine the organic plastic material flowing therethrough against any movement across the thread 56, this is not an absolute essential, it being merely required that the threads 56 be closely adjacent to the bore 48 so that the resistance to flow along the initial portion of the groove 55 is substantially less than that across the thread 56. Following along the groove, there is in effect a progressively greater clearance between the tops of the threads and the inside of the bore 48, as shown at the points 56b, 56c and 56d. In the present instance this is provided by tapering the sleeve or bushing B somewhat and using it in cooperation with the member 47 having the cylindrical bore 48 therein. This relief could also be provided by suitably shaping the cavity in which a sleeve or bushing of uniform diameter might be located, or by a combination of these two. Furthermore, as shown, the groove 55 is so formed in the bushing B that the thickness from the bottom of the groove to the interior of the bushing is substantially constant at all points of the groove. Thus, the taper of the outside of the sleeve or bushing B results in an effective reduction in the depth and a consequent reduction in the cross sectional area of the groove 55 toward the orifice of the nozzle, so that the organic plastic material is progressively forced into the form of an annular curtain disposed between the sleeve or bushing B and the interior wall of the bore 48.

Furthermore, as the material flows over the threads 56 entirely around the sleeve or bushing B and must weld with the material in the portion of the groove toward which it flows, the welding is distributed substantially uniformly around the annular curtain of organic plastic material which is formed, so as to preclude the localization of the welds in such a way as to make a perceptible seam or weld in the finished tube as it is extruded from the nozzle, which might be a point or line of weakness.

It will be observed by reference to Figs. 3 and 5 that the organic plastic material is reduced in both internal and external diameters and increased in wall thickness to form the tube e, the dimensions of which are determined by the dimensions of the outer nozzle tube 61 and the inner nozzle tube or plug 71 which are selected according to the requirements for the production of the articles to be made. In the illustrated embodiment, the inner nozzle member or plug 71 and the outer nozzle tube 61 are proportioned for the production from the tube e of narrow neck containers or bottles. The tube e also is heated both internally and externally throughout substantially the entire length of the nozzle C by the means previously described, so that the welding of the organic plastic material will be completed and the material will be at the desired working temperature and viscosity as it is extruded from the nozzle.

Considering now the formation of hollow articles from the tube e, reference will be made first to Figs. 7 to 12 inclusive. As shown in these figures, the inner nozzle tube or plug 71 is held in a stationary position at all times by the means previously described.

After the mold F, containing a finished article f has been moved to its lower position, as shown in Fig. 12, a thin, annular connecting portion of organic plastic material, drawn out by the descent of the mold may extend between the nozzle C and the mold F, as shown at g', although this connection may be broken by the mold descent. The operations shown in Fig. 7 now occur. The device 96 and the shear 92 are swung together like a pair of cooperating shears, the device 96 breaking the connection g, if it is not previously broken, and the knife 92 wiping across the bottom of the nozzle C in smearing relation thereto to remove the depending plastic material from the nozzle by severing from the bottom of the tube e of organic plastic material the stub of the connection g, which is caught by device 96, as shown at h, and to bring the button 93 into registry with the orifice 67a.

As the knife 92 moves into the position shown in Fig. 1, it also wipes or smears some of the fluent plastic material across the orifice 67a to form a film i, Fig. 7, which effectively closes the end of the tube e. The film i is now thickened, as shown at j, Fig. 8, by more fluent organic plastic material which runs down from the inside of the tube e between the tip 72 and the ring 67, the film being supported and chilled from below by the button 93 for a sufficient period of time to permit the thickening or building up of the organic plastic material thereon and the formation of the bottom j of the tube e. This period will vary with different compositions and/or different sizes of tubes.

The knife 92 and the device 96 are now retracted and the extruding operation may now be initiated. Upon retraction, the device 96 discharges the cut-off stub h from the machine so that this stub is prevented from dropping into the article f.

In order to obtain the best results in closing the end of the tube e in the above manner, the tube e should have the minimum internal diameter because the smaller the hole in the tube, the easier it is to close it. Therefore, the orifice 67a is made as small as is consistent with proper extrusion of the material to provide a constriction in the extruded tube thereof.

Upon completion of the end closing and bottom forming operation, sufficient pressure will have been developed in the organic plastic material in confinement in the machine by the descent of the plunger 25, Fig. 3, in the plasticating device A to begin the extrusion of the closed-ended tube. The plunger 25 starts its downstroke as the result of the operation of the switch 32 by the cam 33 on the timing shaft 34, this cam being so designed and set that the plunger will begin its downstroke at a time sufficiently in advance of the completion of the end closing operation to compress the granular organic plastic material at a and to build up the desired extruding pressure through the material in the machine to start the extrusion when the end closing operation is completed.

The organic plastic material is now extruded from the nozzle C as shown in Figs. 9 and 10 while low pressure air is supplied from the valve 77 and through the tube 73 to expand the closed-ended tubular body to a slightly bulbous form as shown at k and l.

Meantime, the mold E is moved into position to enclose the hollow form or blank and the head 107 is moved downwardly into engagement with the top of the mold by the above described mechanism actuated by the cam 115 on the timing shaft 34. These operations are so timed that the hollow form or blank l touches the bottom plate 116 as the extrusion terminates in order to center the blank in the mold, Fig. 10.

It will be understood that the proper amount of powdered or granular organic plastic material is introduced into the plasticating device A and the stroke of plunger 25 so regulated or adjusted, that the blank $l$ will be of the desired length when the plunger movement is reversed by the switch 36, Fig. 1.

High pressure air may now be admitted to the interior of the blank to blow it to final form in contact with the walls of the mold whereupon the organic plastic material is rigidified in situ. When operating on thermoplastic material the molds may be cooled by natural radiation or by forced cooling as may be desirable or necessary.

When the blowing is completed and the hollow article $f$ is sufficiently rigidified or set, the mold E may be lowered and head 107 raised. This leaves a thinly drawn connection of material $g$ between the article $f$ and the tube $e$ as shown in Fig. 12, which connection is now severed as described above with reference to Fig. 7 to begin another article forming cycle.

After the severing operation, some of the material forming the connecting portion $g$ remains attached to the neck of the article. This may be so thin and brittle as to permit it to be broken or pulled off by the operator and in any case it may readily be cut off to provide a smooth top to the neck finish.

In the modification of the method shown in Figs. 13 to 18 inclusive, the operations are similar to those in Figs. 7 to 12 except that the inner nozzle member or plug 71 is reciprocated and the button 93 is omitted. The inner nozzle member or plug 71 is held in raised position in performing the operations shown in Figs. 13 to 15, and is seated as shown in Fig. 16 as the blank $l$ is completed, the portion 72a of tip 72 moving in shearing relation through the orifice 67a. This shears the tubular stream of organic plastic material, as shown in Fig. 16, the top of the blank $l$ adhering to the plunger tip to support the blank until it is blown by high pressure air as shown in Fig. 17 to blow the blank into the form of the bottle $f$. As the mold E is lowered, as shown in Fig. 18, plug 71 is raised and attains its uppermost position at about the time the shear 92 is operated, as shown in Fig. 13. The raising of the inner nozzle tube or plug 71 permits the fluent organic plastic material of the tube $e$ to flow out of the orifice 67a in time for the knife 92 to form a film $i$ by its movement in smearing relation to the end of the nozzle, thus closing the end of the tube $e$ as the knife removes the stub of the connection $g$. The removed stub is shown at $h$, Fig. 13.

Figure 14:
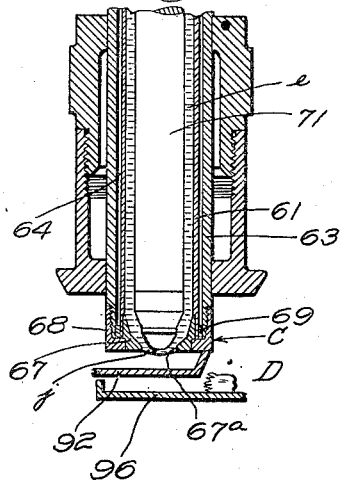

The raising of the inner nozzle tube or plug 71 also permits organic plastic material to flow down onto the film $i$ to thicken it, as shown at $j$, Fig. 14, although in this case the film is not supported from beneath, as in Fig. 8.

Figure 15:
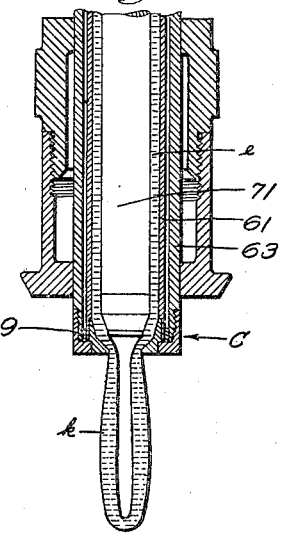
Figure 16:
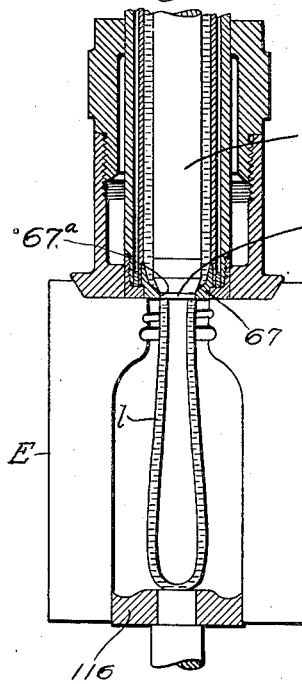
Figures 17, 18:
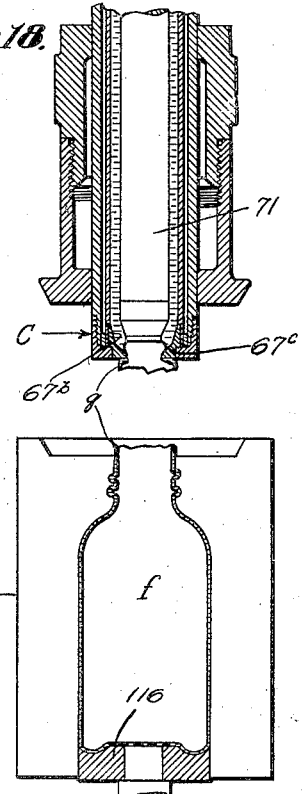

The tube of organic plastic material, thus closed is now extruded and low pressure air supplied to prevent the collapse thereof and to develop the hollow blank as indicated at $k$ and $l$, Figs 15 and 16; the mold E being closed about the blank as shown in Fig. 16 and the blank $l$ blown to final shape as above explained. Following this, the mold E is lowered as shown in Fig. 18. This may break the connection $g$ of thin organic plastic material leaving only a thin stub on the nozzle C and a thin edge on the neck finish of the article $f$. The stub on the nozzle C is removed by the operation of the knife 92, Fig. 13, as already explained and the portion attached to the neck finish of the bottle may be pulled off or cut away to complete the bottle.

It will be seen that I have provided a novel and efficient method and means for forming a tubular body of organic plastic material, for closing the end of the tube and for blowing the tube into a hollow article such as a bottle.

Although my novel tube forming method and means is particularly useful in making blown hollow articles from organic plastic materials, such as containers or bottles, it will be obvious that it also is adapted to form lengths of tubing or articles other than containers. Claims directed to the tube forming method and means per se are intended to cover all uses which may be made of this part of the invention.

Various changes may be made in the details of construction and in the performance of the method without departing from the scope of the claims. The invention may be employed in forming tubing or hollow articles or containers from thermosetting as well as thermoplastic compositions, it being understood that where thermosetting compositions are employed, the articles will be hardened or rigidified by further heating instead of by cooling.

Having thus described my invention, what I claim is:

1. The method of forming a hollow article from organic plastic material which is expansible by blowing and may thereafter be rigidified, comprising the steps of supplying such material in a fluent and moldable condition into a tubular space within an extrusion nozzle, closing the leading end of the tubular body of material in the nozzle at the discharge opening of the nozzle by severing a portion of the material extending from the discharge end of the nozzle from the material within the nozzle in smearing relation with the discharge end of the nozzle and thereby forming a film of the plastic material closing the leading end of the tubular body thereof in the nozzle, thereafter extruding plastic material from the nozzle as a closed-ended tubular body, and supplying fluid pressure to the interior of the closed-ended tubular body to expand it to the shape of the article being formed.

2. The method according to claim 1 as applied to the making of a plurality of hollow articles in periodically recurring cycles, wherein each of said articles, after it has been completed, is severed from the plastic material within the nozzle at a place spaced from the end of the nozzle to leave some organic plastic material outside the nozzle integral with that material within the nozzle, and wherein the severing of the plastic material outside the nozzle from that within the nozzle for forming an end-closing portion or film closing the leading end of the tubular body within the nozzle severs the plastic material without the nozzle from that within the nozzle.

3. The method according to claim 2, wherein the severing of a portion of plastic material from without the nozzle from that within the nozzle for forming an end-closing portion on the tubular body of plastic material within the nozzle is effected by a single shearing means wiping across the discharge end of the nozzle.

4. The method of forming a hollow article from organic plastic material which is expansible by blowing and may thereafter be rigidified, comprising the steps of supplying such material in a fluent and moldable condition into a tubular space within an extrusion nozzle, closing the leading end of the tubular body of material in the nozzle at the discharge end of the nozzle by severing a portion of the material extending from the discharge end of the nozzle from the material within the nozzle in smearing relation with the discharge end of the nozzle and thereby forming a film of the plastic material closing the leading end of the tubular body thereof in the nozzle, causing a flow of the plastic material within the nozzle toward the discharge end thereof so as to thicken the end-closing film at the discharge end of the nozzle, thereafter extruding plastic material from the nozzle as a closed-ended tubular body, and supplying fluid pressure to the interior of the closed-ended tubular body to expand it to the shape of the article being formed.

5. The method according to claim 4, wherein the end-closing portion of organic plastic material at the leading end of the tubular body thereof within the nozzle formed as aforesaid is supported from below and chilled during at least a part of the period during which this end-closing portion is being thickened as aforesaid.

6. The method of forming a hollow article from organic plastic material which is expansible by blowing and may thereafter be rigidified, comprising the steps of supplying such material in a fluent and moldable condition into a tubular space within an extrusion nozzle which has a constricted outlet orifice, closing the leading end of the tubular body of material in the nozzle at the orifice thereof by severing a portion of the material extending from the orifice of the nozzle from the material within the nozzle in smearing relation with the discharge end of the nozzle and thereby forming a film of plastic material across said orifice closing the leading end of the tubular body of plastic material within the nozzle, thereafter extruding plastic material from the nozzle as a closed-ended tubular body, and supplying fluid pressure to the interior of the closed-ended tubular body to expand it to the shape of the article being formed, whereby the constriction of the plastic material at the orifice of the nozzle where the end-closing film is to be formed assists the closing of the end at this point.

7. Apparatus for forming organic plastic material into a seamless tube, comprising an extrusion nozzle including inner and outer nozzle members defining an annular extrusion passage terminating in a discharge orifice, said passage being uninterrupted for a substantial distance from said orifice, stationary means associated with one of said nozzle members at a position spaced from said orifice and providing a substantially helical groove formed between thread portions facing the other of said nozzle members, the thread portions which define the entrance end portion of said groove being so close to said other nozzle member as to constrain a major portion at least of the plastic material supplied to the entrance end portion of said groove to flow through said groove in a substantially helical path and the thread portions defining the remainder of said groove being spaced from said other nozzle member a progressively greater distance toward the discharge end of said nozzle to permit a progressively increasing amount of the plastic material to flow as a curtain over the thread portions between adjacent turns of said helical groove, and means for supplying organic plastic material in a fluent and moldable condition to the entrance end portion of said groove under sufficient pressure to cause such material to flow as aforesaid through said groove and over portions at least of the said thread portions and thence through said uninterrupted portion of said annular extrusion passage to and out of said discharge orifice.

8. Apparatus for forming organic plastic material into a seamless tube, comprising an extrusion nozzle including inner and outer nozzle members defining an annular passage terminating in a discharge orifice, said passage being uninterrupted for a substantial discharge from said orifice, stationary means associated with one of said nozzle members, at a position spaced from said orifice, providing a substantially helical groove formed between thread portions facing the other of said nozzle members, said thread portions defining the entrance part of said groove being in substantial contact with said other nozzle member and said thread portions defining the remainder of said groove being spaced from said other nozzle member a progressively greater distance toward the discharge end of the nozzle, and means for supplying organic plastic material in a fluent and moldable condition to the entrance part of said helical groove and for causing said material to flow through said groove in a substantially helical path and also to flow as an annular curtain over said thread portions which are spaced from said other nozzle member between adjacent turns of said helical groove and thence through said uninterrupted portion of said annular passage to and out of said discharge orifice.

9. Apparatus for forming organic plastic material into a seamless tube in accordance with claim 7, wherein the stationary means providing said helical groove includes external threads facing said outer nozzle member.

10. Apparatus for forming organic plastic material into a seamless tube in accordance with claim 7, wherein said helical groove is of progressively less depth from the bottom of the groove to the top of the thread portions by which it is defined in a direction toward the discharge end of the nozzle, so that the organic plastic material flowing through said groove is forced progressively into said annular curtain until, at the termination of said groove toward the discharge end of the nozzle, all said material is forced into said annular curtain without perceptible welds or seams therein.

11. Apparatus for forming organic plastic material into a seamless tube in accordance with claim 7, wherein said groove is defined by threads formed as a part of a stationary bushing or sleeve member interposed between said inner and outer nozzle members at a position spaced from said orifice, and wherein means are provided for moving said inner nozzle member in respect to said outer nozzle member.

12. Apparatus for forming organic plastic material into a seamless tube, comprising an extrusion nozzle including inner and outer nozzle members defining an annular passage terminating in a discharge orifice, said passage being uninterrupted for a substantial distance from said orifice, a stationary sleeve or bushing interposed between said inner and outer nozzle members, at a position spaced from said orifice, providing a substantially helical groove between external thread portions facing said outer nozzle member, said groove being in effect of gradually diminishing depth due to said thread portions being formed in a portion of said sleeve or bushing which is substantially coextensive with the interior of said outer nozzle member at a point distant from said orifice and which tapers gradually toward said orifice so as to provide an annular space of progressively increasing width between the tops of said thread portions and the inside of said outer nozzle member, and means for supplying organic plastic material in a fluent and moldable condition to a portion of said helical groove distant from said orifice and for causing said material to flow through said groove in a substantially helical path and also to flow as an annular curtain over the thread portions between adjacent turns of said helical groove.

13. Apparatus for forming organic plastic material into a seamless tube in accordance with claim 12, comprising in addition a rigid support for said outer nozzle member and for said stationary sleeve or bushing, and means for axially moving said inner nozzle member in respect to said support, said sleeve or bushing and said outer nozzle member.

14. Apparatus for forming a hollow article from organic plastic material, comprising an extrusion nozzle including inner and outer nozzle members defining an annular passage terminating in a discharge orifice, said passage being uninterrupted for a substantial distance from said orifice, stationary means associated with one of said nozzle members, at a position spaced from said orifice, providing a substantially helical groove formed between thread portions facing the other of said nozzle members, the thread portions which define the entrance part of said groove being closely adjacent to said other nozzle member and the thread portions which define the remainder of said groove being spaced from said other nozzle member a progressively greater distance toward said orifice, means for supplying organic plastic material in a fluent and moldable condition to the entrance part of said helical groove and for causing said material to flow through said groove in a substantially helical path and also to flow as an annular curtain over the thread portions between adjacent turns of said helical groove and thence through the uninterrupted portion of said annular passage to and out of said orifice, means for forming an end-closing portion for the tubular body of plastic material in said nozzle adjacent to the discharge end thereof, and means effective during and after organic plastic material has been extruded from said nozzle as a closed-ended hollow tubular body for supplying fluid under pressure to the interior of this body to prevent the collapse thereof during the extrusion of the body from said nozzle and to expand the extruded material to the shape of the desired article.

15. Apparatus for forming a hollow article from organic plastic material, comprising an extrusion nozzle including inner and outer nozzle members defining an annular passage terminating in a discharge orifice, said passage being uninterrupted for a substantial distance from said orifice, stationary means associated with one of said nozzle members at a position spaced from said orifice, providing a substantially helical groove formed between thread portions facing the other of said nozzle members, the thread portions which define the entrance part of said groove being closely adjacent to said other nozzle member and the thread portions which define the remainder of said groove being spaced from said other nozzle member a progressively greater distance toward said orifice, means for supplying organic plastic material in a fluent and moldable condition to the entrance part of said helical groove and for causing said material to flow through said groove in a substantially helical path and also to flow as an annular curtain over the thread portions between adjacent turns of said helical groove and thence through the uninterrupted portion of said annular passage to and out of said orifice, a shearing means cooperating with the discharge end of said nozzle to sever plastic material extending therefrom in smearing relation with the end of the nozzle and also to form a film across the end of the hollow tubular body of plastic material within the nozzle in end-closing relation therewith, and means effective during and after plastic material has been extruded from said nozzle as a closed-ended hollow tubular body for supplying fluid under pressure to the interior of this body to prevent the collapse thereof during the extrusion of the body from said nozzle and to expand the extruded material to the shape of the desired article.

16. Apparatus for forming a hollow article from organic plastic material, comprising an extrusion nozzle including inner and outer nozzle members defining an annular passage therebetween, which terminates in an extrusion orifice at the discharge end of said nozzle, means for supplying organic plastic material in a fluent and moldable condition to and through the annular passage of said nozzle and for extruding it therefrom, means for closing the end of the tubular body of plastic material in the annular passage of said nozzle at the discharge orifice thereof including a device for severing plastic material extending from the orifice of said nozzle in smearing relation with the end of the nozzle and so as to form an end-closing film at the end of the tubular body of plastic material in said nozzle, and means for supplying fluid pressure through said inner nozzle member to expand a closed-ended tubular body of plastic material extruded from said nozzle to the shape of the desired article.

17. Apparatus for automatically forming hollow articles from organic plastic material, comprising an extrusion nozzle including inner and outer nozzle members defining an annular passage therebetween, which terminates in an extrusion orifice at the discharge end of said nozzle, means for supplying organic plastic material in a fluent and moldable condition to and through the annular passage of said nozzle and for extruding it therefrom, means for closing the end of the tubular body of plastic material in the annular passage of said nozzle at the discharge end thereof including a device for severing plastic material extending from the orifice of said nozzle in smearing relation with the end of the nozzle and so as to form an end-closing film at the end of the tubular body of plastic material in said nozzle, means for supplying fluid pressure through said inner nozzle member to expand a closed-ended tubular body of plastic material extruded from said nozzle to the shape of a desired article, and means for timing the supplying of organic plastic material to and through said nozzle in respect to the operation of said severing device, all said means operating automatically and in regularly recurring cycles in the making of a plurality of articles.

18. Apparatus for forming a hollow article from organic plastic material, comprising an extrusion nozzle including inner and outer nozzle members defining an annular passage therebetween, which terminates in an extrusion orifice at the discharge end of said nozzle, means for supplying organic plastic material in a fluent and moldable condition to and through the annular passage of said nozzle and for extruding it therefrom, means for closing the end of the tubular body of plastic material in the annular passage of said nozzle at the discharge orifice thereof including a device for severing plastic material extending from the orifice of said nozzle in smearing relation with the end of the nozzle so as to form an end-closing film at the end of the tubular body of plastic material in said nozzle, the plastic material being further supplied as aforesaid to thicken the end-closing film thus formed, means for supporting and chilling the end-closing portion of plastic material adjacent to the orifice of said nozzle during at least a part of the thickening thereof as aforesaid, and means for supplying fluid pressure through said inner nozzle member to expand a closed-ended tubular body of plastic material extruded from said nozzle to the shape of the desired article.

19. Apparatus for forming a hollow article from organic plastic material, comprising an extrusion nozzle including an outer nozzle member having an extrusion orifice formed therein at the discharge end of the nozzle and an inner nozzle member having its end at the discharge end of the nozzle formed to fit in the orifice of said outer nozzle member to effect a shearing of plastic material at the discharge end of the nozzle upon the relative movement of said nozzle members, said nozzle members being spaced apart to provide an annular passage therebetween for the plastic material, means for supplying organic plastic material in a fluent and moldable condition to and through the annular passage of said nozzle and for extruding it therefrom, means for closing the end of the tubular body of plastic material in the annular passage of said nozzle at the discharge end thereof including a device for severing plastic material extending from the orifice of said nozzle in smearing relation with the end of said nozzle so as to form an end-closing film at the end of the tubular body of plastic material in said nozzle, the means for supplying plastic material aforesaid operating thereafter to extrude a closed-ended body of plastic material from said nozzle, means for then moving said inner nozzle member in respect to said outer nozzle member to sever the plastic material extruded from the nozzle from that remaining within the nozzle, the material outside the nozzle adhering to the end of said outer nozzle member, and means for supplying fluid pressure through said inner nozzle member to expand the closed-ended body of plastic material adhering to said nozzle to the shape of the desired article.

20. Apparatus for forming a hollow article from organic plastic material, comprising an extrusion nozzle providing an annular passage for plastic material, which terminates in an extrusion orifice at the discharge end of said nozzle, means for supplying organic plastic material in a fluent and moldable condition to and through the annular passage of said nozzle and for extruding it therefrom, means for closing the end of the tubular body of plastic material in the annular passage of said nozzle at the discharge orifice thereof including a device for severing plastic material extending from the orifice of said nozzle in smearing relation with the end of the nozzle so as to form an end-closing film at the end of the tubular body of plastic material in said nozzle, means for supplying fluid pressure through said nozzle to the interior of a closed-ended tubular body of plastic material extruded from said nozzle to expand it to the shape of the desired article, and additional means for severing the article thus formed from the body of plastic material within said nozzle.

21. Apparatus for forming a hollow article from organic plastic material, comprising an extrusion nozzle including inner and outer nozzle members defining an annular passage therebetween, which terminates in an extrusion orifice at the discharge end of said nozzle, means for supplying organic plastic material in a fluent and moldable condition to and through the annular passage of said nozzle and for extruding it therefrom, means for closing the end of the tubular body of plastic material in the annular passage of said nozzle at the discharge orifice thereof including a single shear for severing plastic material extending from the orifice of said nozzle in smearing relation with the end of the nozzle so as to form an end-closing film at the end of the tubular body of plastic material in said nozzle, means for supplying fluid pressure through said inner nozzle member to expand a closed-ended tubular body of plastic material extruded from said nozzle to the shape of the desired article, and a device spaced from the discharge end of said nozzle and operable simultaneously with said single shear for severing a completed article from said nozzle and having an upturned end portion for receiving a portion of plastic material cut from that within said nozzle by said single shear and deflecting such cut portion of plastic material to such a position that it will not drop into the interior of a hollow article formed as aforesaid.

WILLIAM H. KOPITKE.

CERTIFICATE OF CORRECTION.

Patent No. 2,260,750.　　　　　　　　　　　　　　　October 28, 1941.

WILLIAM H. KOPITKE.

It is hereby certified that error appears in the printed specification of the above numbered patent requiring correction as follows: Page 2, first column, line 4, for "method" read --machine--; page 3, first column, line 35, for "the sleeve 61" read --tube 61--; and line 36, for "tube 63" read --the sleeve 63--; page 5, second column, line 16, after "fluent" insert --organic--; page 6, second column, line 62, claim 3, for the claim reference numeral "2" read --1--; and that the said Letters Patent should be read with this correction therein that the same may conform to the record of the case in the Patent Office.

Signed and sealed this 23rd day of December, A. D. 1941.

Henry Van Arsdale,
　　　　　　　　　　　　　　　　　　　　　Acting Commissioner of Patents.

(Seal)